United States Patent
Zimmerman et al.

(12) 
(10) Patent No.: US 6,580,362 B1
(45) Date of Patent: Jun. 17, 2003

(54) AURAL WARNING SYSTEM FOR BUSES

(76) Inventors: Harold B. Zimmerman, 7300 N. 51st Ave., #120, Glendale, AZ (US) 85301; C. Jay Zimmerman, 1218 Marina Cir., Discovery Bay, CA (US) 94514

( * ) Notice: Subject to any disclaimer, the term of this patent is extended or adjusted under 35 U.S.C. 154(b) by 0 days.

(21) Appl. No.: 10/124,005

(22) Filed: Apr. 17, 2002

(51) Int. Cl.[7] ................................................. B60Q 1/00
(52) U.S. Cl. .................. 340/425.5; 340/433; 340/441; 340/468; 340/521; 340/522; 340/692
(58) Field of Search ........................... 340/433, 425.5, 340/441, 521, 522, 691.1, 692, 936, 905, 994, 468; 362/478, 481

(56) References Cited

U.S. PATENT DOCUMENTS

| | | | | |
|---|---|---|---|---|
| 3,838,392 A | * | 9/1974 | Lockwood et al. | 340/433 |
| 4,559,517 A | * | 12/1985 | Rahn | 340/433 |
| 5,293,151 A | * | 3/1994 | Rose | 340/433 |
| 6,396,395 B1 | * | 5/2002 | Zielinski et al. | 340/425.5 |

* cited by examiner

Primary Examiner—Daniel J. Wu
Assistant Examiner—Lam Pham
(74) Attorney, Agent, or Firm—Frank J. McGue

(57) ABSTRACT

An aural warning system for buses is provided which comprises a logic controller circuit board in electrical communication with an audible alarm. The logic controller circuit board actuates the audible alarm in a preprogrammed response to input data. The input data is provided by one or more loading lights which sending an on/off signal to the logic controller circuit board, a speed sensor which provides information as to the speed of the bus to the logic controller circuit board, and an open/closed switch providing information regarding the open/closed status of one or more doors of the bus. The preprogrammed response actuates the audible alarm when the one or more loading lights are on, the speed sensor when the speed of the bus is less than a threshold speed and the one or more doors are closed.

18 Claims, 4 Drawing Sheets

AURAL WARNING SYSTEM FOR BUSES

TECHNICAL FIELD

This invention relates in general to aural warning systems, and, more particularly, to aural warning systems for use with buses, specifically, school buses.

BACKGROUND OF THE INVENTION

The most dangerous place around a school bus is the loading and unloading zone defined as a 10 foot wide area around a school bus. In a study originally developed by the Kansas Department of Transportation which is updated yearly by the Pupil Transportation Unit of the Kansas Department of Education, 1078 children have been killed in this zone in the years 1970 through 2001 in the United States. Of the 1078 fatalities in the aforementioned zone, 385 were victims of a passing car. Thus, 693 children were killed in the loading and unloading zone by their own bus.

By way of comparison, the number of children who are killed while riding inside a school bus averages 11 per year, or approximately 350 deaths for the 1970–2001 time frame.

Children are often easily distracted by activity around them and thus may miss the visual cues that an unsafe condition exists, specifically, that the bus is moving or about to move. Thus, there is a need for an additional warning system which is not limited to visual cues, but provides aural cues that a bus is in motion, or about to be in motion.

The present invention meets this need.

SUMMARY OF THE INVENTION

It is an object of this invention to provide an aural warning to persons proximate to a moving vehicle.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
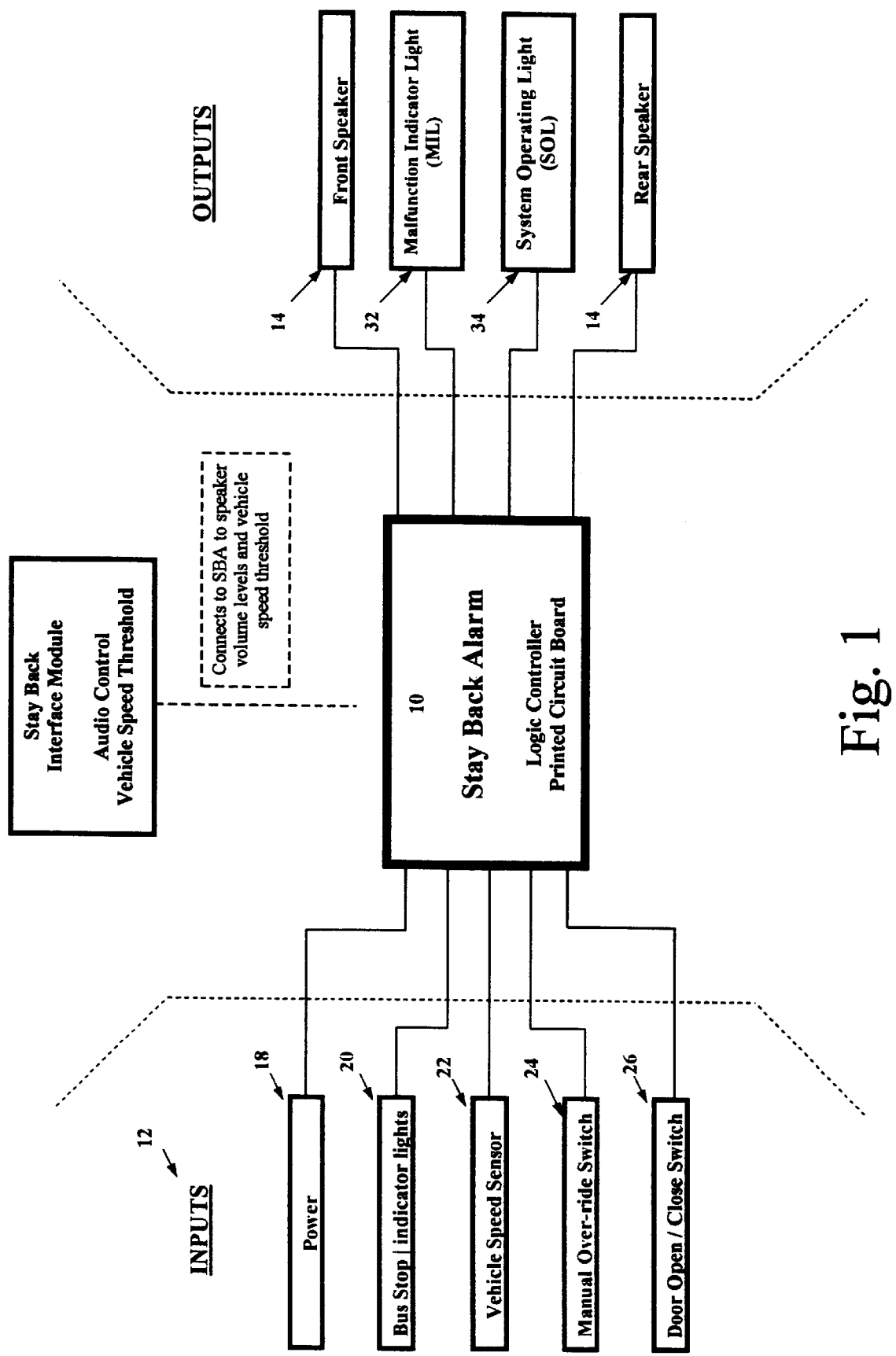
FIG. 1 is a schematic showing the system installed in a bus.
Figure 2:
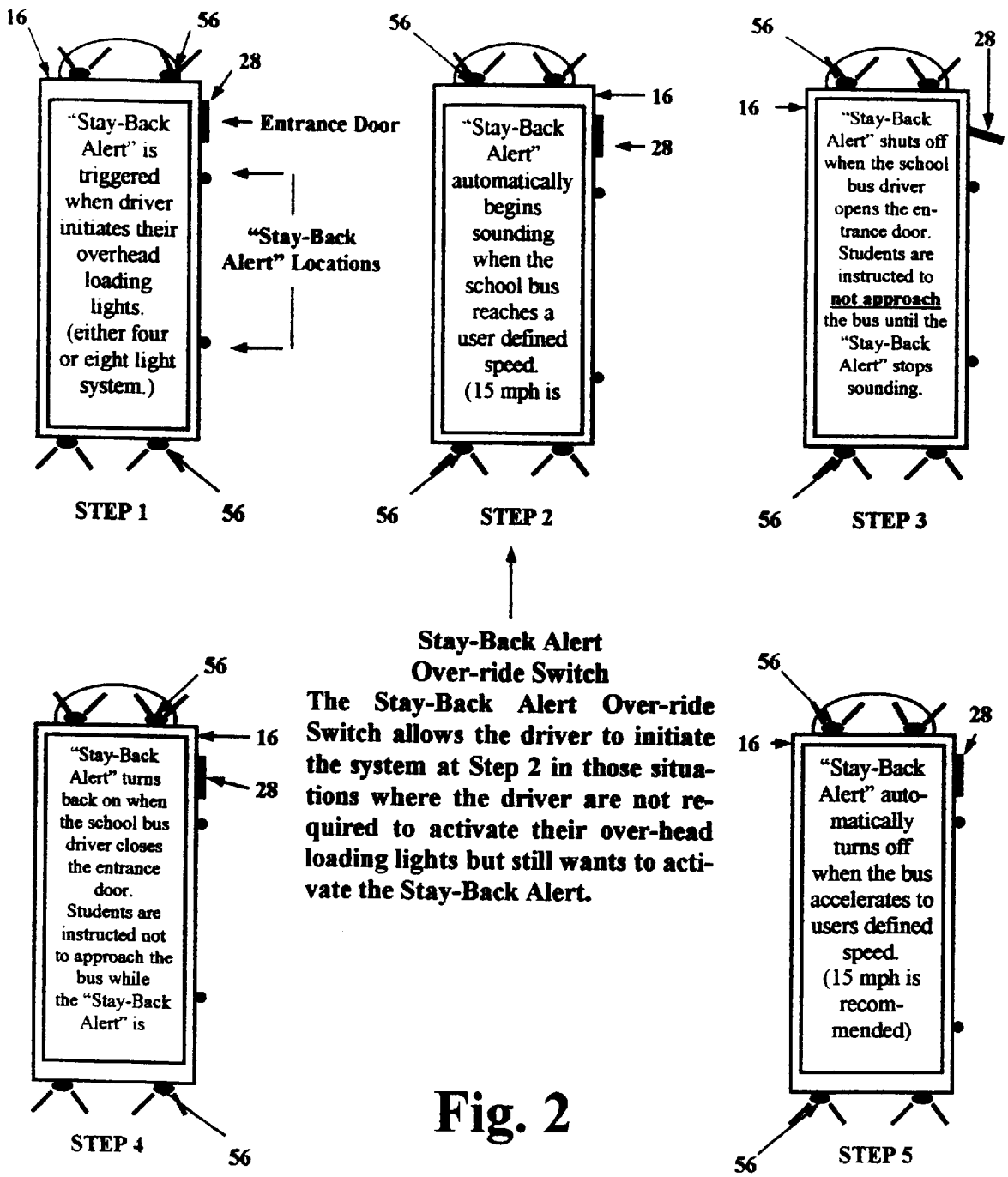
FIG. 2 is a top view of the bus showing the operation of the system.
Figure 4:
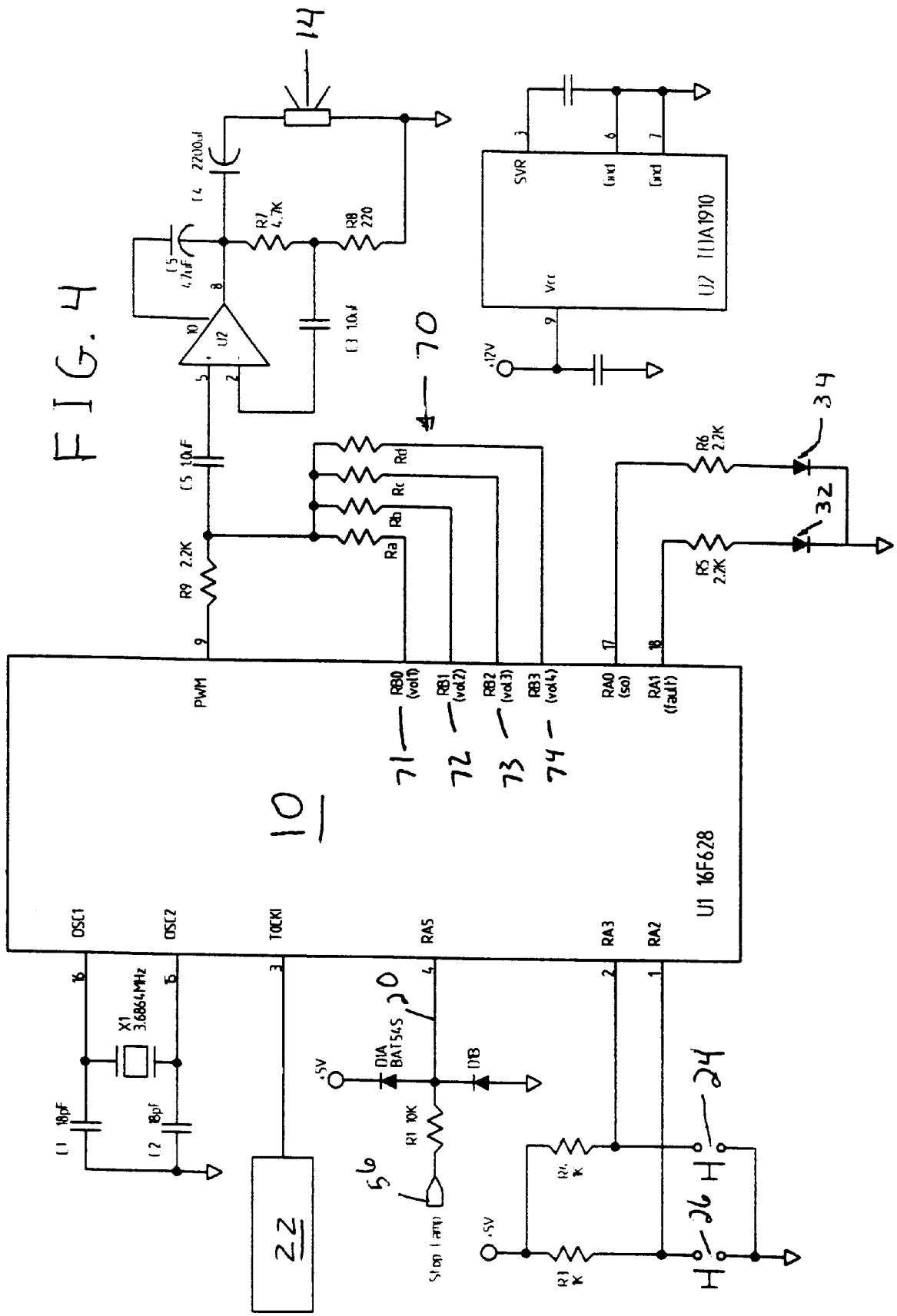
FIG. 4 is an electrical schematic showing one embodiment of the system.

An aural warning system for buses 16, in the illustrated embodiment, school buses 16, of the present invention as seen in FIGS. 1–2 and 4, comprises a logic controller circuit board 10 which receives a plurality of input data 12 and, in preprogrammed response to that plurality of data 12, causes an audible alarm 14 which alerts nearby individuals that bus 16 is in motion.

As best seen in FIG. 1, logic controller circuit board 10 receives input which includes power 18 from the electrical system of bus 16, on/off signals 20 from loading lights 56, speed data from a speed sensor 22 providing information as to the speed of the bus, an on/off signal from manual override switch 24 and an open/closed switch 26 providing information regarding the status of doors 28 of bus 16.

In response to the plurality of data 12 received, logic controller circuit board 10, under the conditions described in detail below, has output devices including audible alarms 14 via front and rear speakers 30, a system malfunction light 32 and a system operating light 34. In addition, an interface module 36 is provided which allows personnel to alter the parameters with which the system operates. Specifically, interface module 36 permits personnel to vary to the speed threshold and the audible alarm volume as desired.

Figure 3:
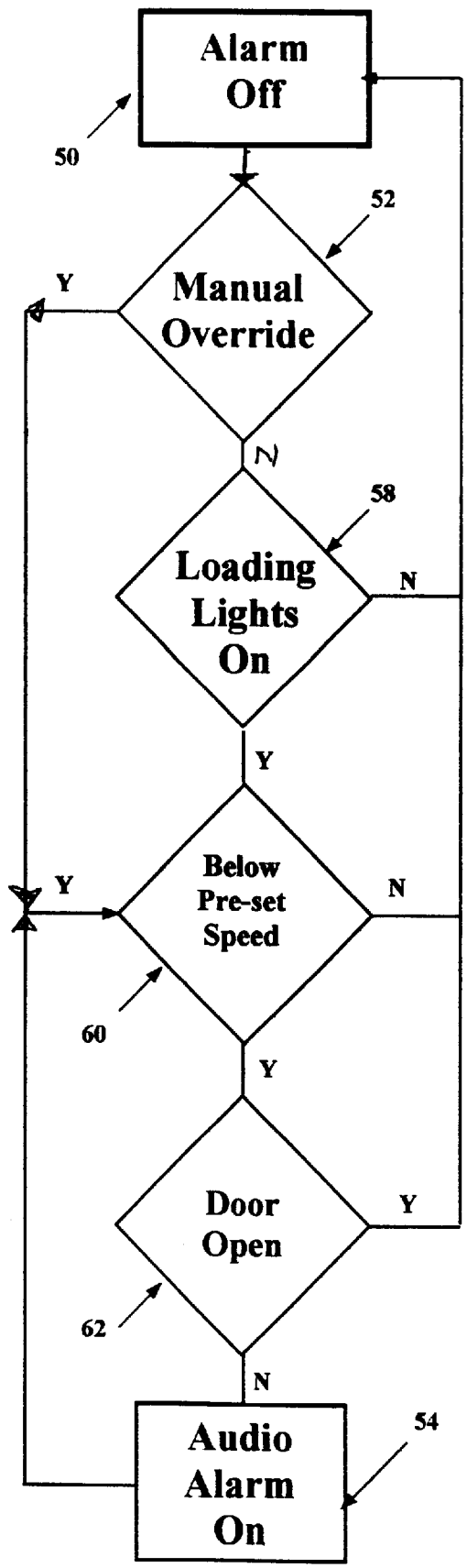
FIG. 3 is a flowchart showing how the system operates.

As best illustrated in FIGS. 2 and 3, when bus 16 is operating initially, audible alarm 14 is off. Logic controller circuit board 10 first checks whether manual override switch 24 in the on or off position at box 52. If manual override switch 24 is on, then logic controller circuit board skips box 58 and goes directly to box 60 until the manual override switch is turned off. Manual override switch 24 allows an individual to actuate audible alarm 14 if needed even when loading lights 56 are not operating.

If manual override switch 24 is off in box 52, logic controller circuit board 10 checks on/off signals 20 to see if loading lights 56 are on in box 58. If loading lights 56 are off, logic controller circuit board 10 loops back to box 50. If loading lights 58 are on, logic controller circuit board 10 checks speed sensor 22 to determine if the speed of bus 16 is less than a preset threshold in box 60.

If the speed is greater than that threshold, logic controller circuit board 10 loops back to box 50. If the speed is less than the threshold, logic controller circuit board 10 next checks open/closed switch 26 to see if door 28 is open in box 62. In the preferred embodiment, the threshold speed is about 15 miles per hour.

If door 28 is open, then logic controller circuit board 10 loops back to box 50. If door 28 is closed, then audible alarm 14 is triggered on in box 54. From box 54, logic controller circuit board 10 will loop back to box 60 to maintain a continuous check on the conditions for operation.

As best seen in FIG. 2, in operation, bus 16 will be traveling its route. In normal operation, manual override switch 24 is in an off position. As it approaches a stop to either pick up or drop off students, the bus driver, as required by statute or regulation, will manually activate loading lights 56 thereby satisfying the conditions of boxes 52 and 58. Note the use of loading lights 56 as a trigger avoids activating audible alarm 14 for non-loading conditions such as stopping at stop lights, stop signs, for traffic, for turns and the like unless the driver actuated manual override switch in box 58.

The bus driver will brake to slow bus 16 and, once the speed of the bus drops below the preset threshold, the conditions of box 60 will be satisfied. At this point also, door 28 is in a closed position and the condition of box 62 is also satisfied. Thus, audible alarm 14 will sound from the time the bus slows below the threshold. Riders are taught to stay clear of bus 16 while audible alarm 14 is operating as said alarm indicates an unsafe condition, namely, that bus 16 is moving.

Audible alarm 14 sounds until one of the aforementioned conditions is no longer met. This latter condition occurs once the bus is stopped and door 28 is opened to allow riders to board the bus. Once door 28 is opened, the condition of box 62 will no longer be satisfied and the audible alarm is silenced. Riders are taught only to board when audible alarm 14 is silent.

Once all riders board, door 28 is closed and the conditions of box 62, and boxes 52, 58 and 60, are again satisfied and audible alarm 14 is reactivated warning persons to stand clear of the now moving, or about to move, bus 16. As the speed of bus 16 crosses the threshold speed required of box 60, then audible alarm is turned off in box 50 and the cycle begins again.

FIG. 4 is a electrical schematic showing one embodiment of the present invention. Logic controller circuit board 10 is in electrical communication and received data from speed sensor 22, loading lights 56, open/closed door switch 26 and manual override 24. Logic controller circuit board 10 is commercially available from such sources as Aegis Technologies, LLC of Flagstaff, Ariz.

In turn, logic controller circuit board 10 is in electrical communication with speaker 14. In this embodiment, logic controller circuit board 10 also provides a volume control 70 which, in this particular embodiment, provides four different volume settings 71, 72, 73 and 74 for use by the bus driver. Logic controller circuit board 10 is programmed as described in connection with the flow chart of FIG. 3.

Although only certain embodiments have been illustrated and described, it will be apparent to those skilled in the art that various changes and modifications may be made therein without departing from the spirit of the invention or from the scope of the appended claims.

What is claimed is:

1. An aural warning system for buses comprises:
    a logic controller circuit board,
    one or more loading lights which provides an on/off signal to the logic controller circuit board,
    a speed sensor which provides information as to the speed of the bus to the logic controller circuit board,
    an open/closed switch providing information regarding the open/closed status of one or more doors of the bus,
    an audible alarm in electrical communication with the logic controller circuit board, the logic controller circuit board in a preprogrammed response to the on/off signal, the speed sensor and the open/closed switch causing the audible alarm to sound thereby warning nearby individuals that said bus is in motion or about to be in motion.

2. The aural warning system of claim 1 further comprising a override switch for actuating the audible alarm manually.

3. The aural warning system of claim 1 wherein the audible alarm comprises a front speaker and an rear speaker.

4. The aural warning system of claim 1 further comprising a system malfunction light in electrical communication with the logic controller circuit board, the logic controller circuit board actuating said system malfunction light in the event a system malfunction is detected by the logic controller circuit board.

5. The aural warning system of claim 1 further comprising a system operating light in electrical communication with the logic controller circuit board and is actuated when the logic controller circuit board is powered.

6. The aural warning system of claim 1 further comprising an interface module in electrical communication with the logic controller circuit board which allows users to alter the preprogrammed response of the logic controller circuit board.

7. The aural warning system of claim 6 wherein the preprogrammed response of the logic controller circuit board being altered is response to the speed being provided by the speed sensor and the volume of the audible alarm.

8. The aural warning system of claim 1 wherein the preprogrammed response actuates the audible alarm when the one or more loading lights are on, the bus is traveling at a speed less than a threshold speed and the one or more doors are closed.

9. The aural warning system of claim 8 wherein the threshold speed is fifteen miles per hour.

10. An aural warning system for buses comprises:
    a logic controller circuit board,
    one or more loading lights which provides an on/off signal to the logic controller circuit board,
    a speed sensor which provides information as to the speed of the bus to the logic controller circuit board,
    an open/closed switch providing information regarding the open/closed status of one or more doors of the bus,
    an audible alarm in electrical communication with the logic controller circuit board,
    the logic controller circuit board, in a preprogrammed response to the on/off signal provided when the one or more loading lights are on, the speed sensor when the speed of the bus is less than a threshold speed and the open/closed switch when the one or more doors are closed, causing the audible alarm to sound thereby warning nearby individuals that said bus is in motion or about to be in motion.

11. The aural warning system of claim 10 further comprising a override switch for actuating the audible alarm manually.

12. The aural warning system of claim 10 wherein the audible alarm comprises a front speaker and an rear speaker.

13. The aural warning system of claim 10 further comprising a system malfunction light in electrical communication with the logic controller circuit board, the logic controller circuit board actuating said system malfunction light in the event a system malfunction is detected by the logic controller circuit board.

14. The aural warning system of claim 10 further comprising a system operating light in electrical communication with the logic controller circuit board and is actuated when the logic controller circuit board is powered.

15. The aural warning system of claim 10 further comprising an interface module in electrical communication with the logic controller circuit board which allows users to alter the preprogrammed response of the logic controller circuit board.

16. The aural warning system of claim 15 wherein the preprogrammed response of the logic controller circuit board being altered is the threshold speed and the volume of the audible alarm.

17. The aural warning system of claim 10 wherein the threshold speed is fifteen miles per hour.

18. An method for providing an aural warning for buses comprises the steps of:
    providing a logic controller circuit board,
    providing an on/off switch providing information as to the on/off status of one or more loading lights to the logic controller circuit board;
    providing information as to the speed of the bus to the logic controller circuit board,
    providing information regarding the open/closed status of one or more doors of the bus,
    providing an audible alarm in electrical communication with the logic controller circuit board,
    sounding the audible alarm when the one or more loading lights are on, the speed of the bus is less than a threshold speed and the one or more doors are closed thereby warning nearby individuals that said bus is in motion or about to be in motion.

\* \* \* \* \*